United States Patent
Halim et al.

(10) Patent No.: US 9,722,487 B2
(45) Date of Patent: Aug. 1, 2017

(54) HYSTERESIS CONTROLLERS FOR POWER FACTOR CORRECTION IN AC/DC POWER CONVERTERS

(71) Applicant: Infineon Technologies AG, Neubiberg (DE)

(72) Inventors: Andriyanto Halim, Singapore (SG); Siew Lee Cheong, Singapore (SG); Attila Tomasovics, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 137 days.

(21) Appl. No.: 14/709,116

(22) Filed: May 11, 2015

(65) Prior Publication Data

US 2016/0336870 A1 Nov. 17, 2016

(51) Int. Cl.
*H02M 1/42* (2007.01)
*H02M 7/217* (2006.01)

(52) U.S. Cl.
CPC ......... *H02M 1/4225* (2013.01); *Y02B 70/126* (2013.01)

(58) Field of Classification Search
CPC ....... H02M 7/217; H02M 1/42; H02M 1/4225
See application file for complete search history.

(56) References Cited

U.S. PATENT DOCUMENTS

| | | | | |
|---|---|---|---|---|
| 6,469,917 B1* | 10/2002 | Ben-Yaakov | ....... | H02M 1/4225 323/222 |
| 2006/0113922 A1* | 6/2006 | Ribarich | ............ | H05B 41/2882 315/209 R |
| 2008/0192514 A1* | 8/2008 | Zhou | ..................... | H02M 3/335 363/21.12 |
| 2011/0068713 A1* | 3/2011 | Hoogzaad | .......... | H05B 33/0815 315/307 |
| 2015/0054421 A1* | 2/2015 | Auer | ................... | H05B 33/0809 315/247 |

OTHER PUBLICATIONS

Azazi, H.Z. et al., "Digital Control of Boost PFC AC-DC Converters with Predictive Control," Proceedings of the 14th International Middle East Power Systems Conference (MEPCON'10), Dec. 19-21, 2010, Paper ID 273, pp. 721-727.
(Continued)

*Primary Examiner* — Jue Zhang
(74) *Attorney, Agent, or Firm* — Shumaker & Sieffert, P.A.

(57) ABSTRACT

Methods, devices, and integrated circuits are disclosed for controlling a power converter. In one example, a controller includes a peak current reference module configured to output a peak current reference. The controller further includes a valley current reference module configured to output a valley current reference. The controller further includes one or more comparators configured to compare a current through the power converter to the peak current reference and the valley current reference, to turn a gate switch of the power converter on when the current through the power converter falls to the valley current reference, and to turn the gate switch of the power converter off when the current through the power converter rises to the peak current reference.

20 Claims, 8 Drawing Sheets

(56) References Cited

OTHER PUBLICATIONS

Sharma, R. et al., "Simulation and Analysis of Power Factor Correction in Electric Control Ssytem for Metal Halide High Intensity Discharge Lamps," Advance in Electronic and Electric Engineering, ISSN 2231-1297, vol. 4, No. 2, 2014, pp. 185-192; no month or day of publication available; vol. 4, Nos. 1-6 are indicated published during 2014; retrieved on Jan. 7, 2015; available at http://www.ripublication.com/aeee_spl/aeeev4n2spl_11.pdf.
Zhou, C. et al., "Design and Analysis of a Hysteretic Boost Power Factor Correction Circuit," 21st Annual IEEE Power Electronics Specialists Conference (PESC), Jun. 11-14, 1990, pp. 800-807.
Rossetto, L. et al., "Control Techniques for Power Factor Correction Converters," Proc. of Power Electronics Motion Control (PEMC), Sep. 1994, pp. 1310-1318.

* cited by examiner

HYSTERESIS CONTROLLERS FOR POWER FACTOR CORRECTION IN AC/DC POWER CONVERTERS

TECHNICAL FIELD

This disclosure relates to power factor correction (PFC) in AC/DC converters, and in particular, to PFC controllers for AC/DC converters.

BACKGROUND

AC/DC power conversion is used in many industrial, commercial, and personal electronic applications. AC/DC conversion involves some inherent inefficiency in terms of power lost between an AC input and a DC output. While some of this inefficiency is inescapable, some inefficiency may also be due to inductance and/or capacitance that reacts against the alternating current, which may be reduced or eliminated with a power factor corrector (PFC). A PFC may be controlled in one of various control modes, such as a Critical Conduction Mode (CrCM) or a Continuous Conduction Mode (CCM), which may be governed by a PFC controller.

CrCM typically provides a lower average output current and may typically be used for low power applications, such as under around 300 watts (W). CrCM provides variable switching frequency and a constant on-time for a gate signal, where the gate signal is switched every time the inductor current of an inductor goes to zero. CrCM thus requires relatively little calculation and is easy to implement. CCM typically provides a higher average output current and is typically used for higher power applications, such as over around 300 watts (W). CCM provides constant switching frequency and variable on-time for the gate signal, where the gate signal switching is based on an average current control method. CCM thus requires more calculation than CrCM.

SUMMARY

In general, various examples of this disclosure are directed to a hysteresis controller for power factor corrector (PFC). In various examples of this disclosure, a hysteresis PFC controller may provide PFC across any power range, with simple calculations imposing only a low processing burden or low CPU load as in CrCM, and also with low stress on the gate switch as in CCM. A hysteresis PFC controller of this disclosure may thus combine advantages of both CrCM and CCM PFC controllers, across either low or high power applications, among other advantages.

In various examples of this disclosure, a hysteresis PFC controller may be implemented as a digital hysteresis PFC controller or as a single comparator hysteresis PFC controller, both of which may provide advantages such as low stress on the gate switch and low processing load. A digital hysteresis PFC controller may control a gate switch to turn on and off between a peak current reference and a valley current reference, both of which are digitally controlled. A single comparator hysteresis PFC controller may be implemented with a single comparator configured to provide feedback to a multiplexer connected to peak and valley references, where the output of the multiplexer feeds through a digital to analog converter (DAC) to an input to the converter, such that a single reference signal alternates between providing both a peak reference and a valley reference, based on the comparator output.

One example is directed to a controller for a power converter. The controller includes a peak current reference module configured to output a peak current reference. The controller further includes a valley current reference module configured to output a valley current reference. The controller further includes one or more comparators configured to compare a current through the power converter to the peak current reference and the valley current reference, to turn a gate switch of the power converter on when the current through the power converter falls to the valley current reference, and to turn the gate switch of the power converter off when the current through the power converter rises to the peak current reference.

Another example is directed to a method of controlling a power converter. The method includes outputting a peak current reference based on a sensed average current of the power converter and a pre-selected peak reference function. The method further includes outputting a valley current reference based on the sensed average current of the power converter and a pre-selected valley reference function. The method further includes comparing a current through the power converter to the peak current reference and the valley current reference. The method further includes turning a gate switch of the power converter on when the current through the power converter falls to the valley current reference, and turning the gate switch of the power converter off when the current through the power converter rises to the peak current reference.

Another example is directed to a device for controlling a power converter. The device includes a multiplier configured to sense a value of power output by the power converter. The device further includes a peak current reference module connected to an output of the multiplier and configured to output a peak current reference based on the power output and a pre-selected peak current reference value. The device further includes a valley current reference module connected to the output of the multiplier and configured to output a valley current reference based on the power output and a pre-selected valley current reference value. The device further includes one or more comparators configured to compare a current through the power converter to the peak current reference and the valley current reference, to turn a gate switch of the power converter on when the current through the power converter falls to the valley current reference, and to turn the gate switch of the power converter off when the current through the power converter rises to the peak current reference.

The details of one or more examples of this disclosure are set forth in the accompanying drawings and the description below. Other features, objects, and advantages of this disclosure will be apparent from the description and drawings, and from the claims.

DETAILED DESCRIPTION

Figure 1:
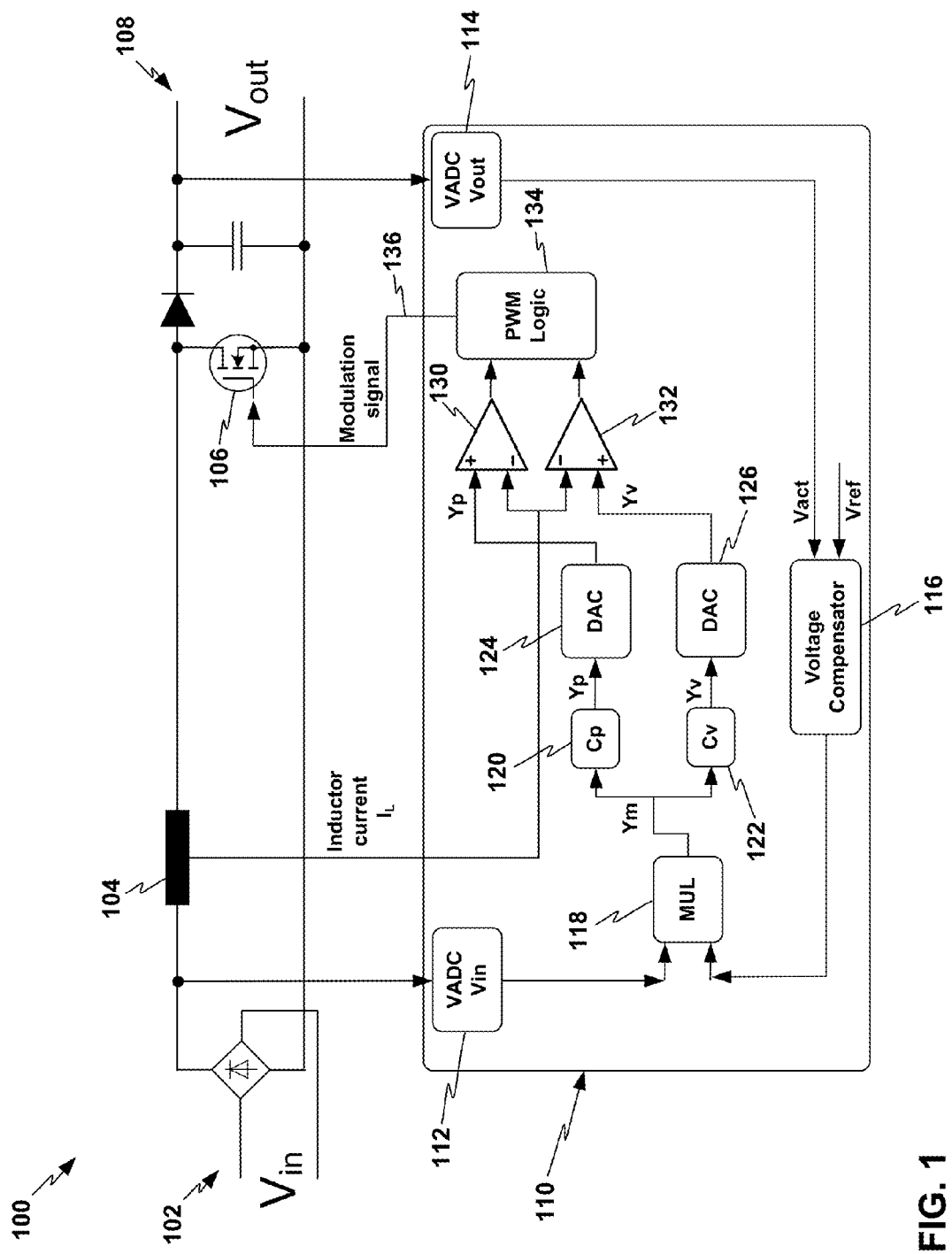
FIG. 1 is a block diagram illustrating an AC/DC power converter with a digital hysteresis PFC controller, according to one example.

FIG. 1 is a block diagram illustrating an AC/DC power converter 100 with a digital hysteresis PFC controller 110 according to one example. Digital hysteresis PFC controller 110 includes input voltage (Vin) voltage analog-to-digital converter (VADC) 112, output voltage (Vout) VADC 114, voltage compensator 116, multiplier 118, peak current reference module 120, valley current reference module 122, digital to analog converters (DACs) 124 and 126, comparators 130 and 132, pulse width modulation (PWM) logic circuit 134, and output pin 136. In some examples, digital hysteresis PFC controller 110 may be implemented as a microcontroller. In some examples, Vin VADC 112, Vout VADC 114, DACs 124 and 126, comparators 130 and 132, and PWM logic module 134 may be implemented as hardware components, and voltage compensator 116, multiplier 118, peak current reference module 120, and valley current reference module 122 may be implemented as modules or portions of software. Software implementations of voltage compensator 116, multiplier 118, peak current reference module 120, and valley current reference module 122 may be implemented as firmware, and may be stored on one or more storage components and/or executed by one or more processing units, such as a central processing unit (CPU) of digital hysteresis PFC controller 110. In other examples, different features of digital hysteresis PFC controller 110 may be implemented in any of various types of hardware and/or software elements. AC/DC power converter 100 also includes voltage in Vin terminal 102, inductor 104, metal-oxide semiconductor field effect transistor (MOSFET) gate switch 106, and voltage out Vout terminal 108.

Digital hysteresis PFC controller 110 includes three inputs from AC/DC power converter 100 and one output to AC/DC power converter 100. As the three inputs, Vin VADC 112 is connected to voltage in Vin terminal 102 to receive the input voltage to AC/DC power converter 100; Vout VADC 114 is connected to voltage out Vout terminal 108 to receive the output voltage of AC/DC power converter 100; and comparators 130 and 132 have their inverting input pins connected to a current sensor at inductor 104 to receive an indication of the inductor current from inductor 104. As the output, PWM logic module 134 is connected to the control terminal of gate switch 106 and configured to deliver a modulation signal to gate switch 106 to turn gate switch 106 on and off, thus controlling the operation of AC/DC power converter 100.

Multiplier 118 generates a reference current signal Ym based on the input voltage and output voltage of AC/DC power converter 100 as indicated by inputs from Vin VADC 112 and Vout VADC 114. Multiplier 118 may be implemented in software executed by a processor to perform a multiplication instruction between a voltage compensator value from voltage compensator 116 and a VADC Vin value from Vin VADC 112 to generate the Ym reference value. In other examples, multiplier 118 may be analogously implemented in analog components using operational amplifiers (op-amps) and transistor circuitry. Peak current reference module 120 and valley current reference module 122 receive the average voltage value Ym from multiplier 118 and generate a peak current reference Yp and a valley current reference Yv, respectively. DACs 124 and 126, respectively, convert the peak current reference Yp and valley current reference Yv to analog form for input to the non-inverting input pins of comparators 130 and 132. As noted above, comparators 130 and 132 have their inverting input pins connected to inductor 104 to measure the inductor current at inductor 104. Comparators 130 and 132 are thus configured to compare the inductor current at inductor 104 to peak current reference Yp and valley current reference Yv provided by peak current reference module 120 and valley current reference module 122, respectively, and to output the results of their comparisons to PWM logic circuit 134.

PWM logic circuit 134 is thus configured to output a switch modulation signal, based on the comparison of the inductor current at inductor 104 to peak current reference Yp and valley current reference Yv, to gate switch 106. Digital hysteresis PFC controller 110 is thus configured to control gate switch 106 to turn on and off between peak current reference Yp and valley current reference Yv under digital control, with low processing burden and low latency for digital hysteresis PFC controller 110 and with low stress on gate switch 106. Aspects of digital hysteresis PFC controller 110 are further described with reference to various examples below.

Figure 2:
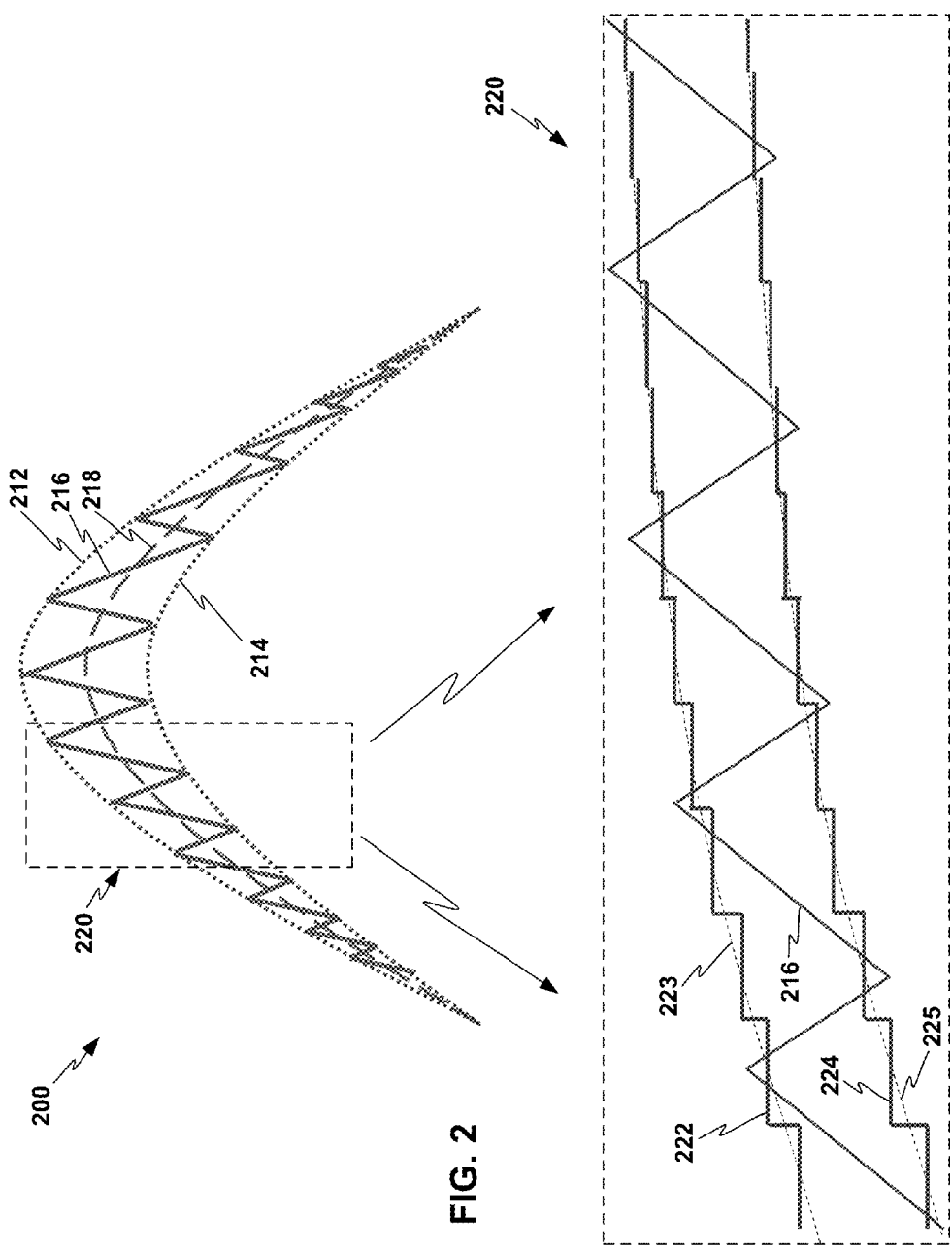
FIG. 2 shows a current waveform of an output current of the AC/DC power converter of FIG. 1 alternating between a peak current reference and a valley current reference under control of digital hysteresis PFC controller, with an average current, according to one example.

FIG. 2 shows a current waveform 200 of an inductor current 216 of AC/DC power converter 100 of FIG. 1 alternating between a peak current reference 212 and a valley current reference 214 under control of digital hysteresis PFC controller 110, with an average current 218, according to one example. Peak current reference 212 and valley current reference 214 shown in FIG. 2 may represent peak current reference Yp and valley current reference Yv supplied by peak current reference module 120 and valley current reference module 122 (and digitized from DACs 124 and 126) of digital hysteresis PFC controller 110 as discussed above. Thus, digital hysteresis PFC controller 110 may control gate switch 106 of AC/DC power converter 100 to alternate between on and off in a timing pattern such that AC/DC power converter 100 generates switching inductor current 216 alternating about average current 218. Digital hysteresis PFC controller 110 may control gate switch 106 to turn on once digital hysteresis PFC controller 110 detects that inductor current 216 has hit valley current reference 214, and digital hysteresis PFC controller 110 may control gate switch 106 to turn off once digital hysteresis PFC controller 110 detects that inductor current 216 has hit peak current reference 212.

FIG. 2 also shows a close-up view 219 of a waveform portion 220 of current waveform 200 with peak current reference 212 and valley current reference 214 under control of digital hysteresis PFC controller 100 of FIG. 2 according to one example. Waveform portion 220 shows how the peak current reference 212 and valley current reference 214 are actually digital, shown in close-up view 219 as digital peak current reference 222 and digital valley current reference 224, such that each changes by small step functions that approximate the smooth analog curves of average peak current reference 223 and average valley current reference 225. As shown in close-up view 219, inductor current 216 of AC/DC power converter 100 approximately alternates between digital peak current reference 222 and digital valley current reference 224, and very slightly overshoots both on each alternation due to inevitable, very small system delay, leading to a very slight increase in ripple current. As close-up view 219 shows, inductor current 216 may actually alternate between average peak current reference 223 and average valley current reference 225 in a closer approximation than alternating between digital peak current reference 222 and digital valley current reference 224, since the inevitable, slight system delay overshoot coincides with the averaging of the digital reference signals of digital peak current reference 222 and digital valley current reference 224.

The deviation of inductor current 216 from average current 218 between peak current reference 212 and valley current reference 214 is the ripple current, which is controlled to be small in this example, as FIG. 2 shows. In some examples, digital hysteresis PFC controller 110 may control the peak current reference 212 and valley current reference 214 as ratios about a desired average current with a desired ripple current. Digital hysteresis PFC controller 110 may store a desired average current and a desired ripple current in firmware in some examples, and may control peak current reference 212 and valley current reference 214 in accordance with the desired average current and a desired ripple current. In some examples, digital hysteresis PFC controller 110 may perform control such that the peak current reference 212 (or Yp) and valley current reference 214 (or Yv) may be related to a peak current ratio constant (or multiplier constant) Cp, a valley current ratio constant Cv, average current Ym (or average current 218), and ripple current $K_R$ according to Equations 1 and 2:

$$C_p = \frac{Y_p}{Y_m} = \frac{2K_R}{K_R + 1} \quad \text{(Eq. 1)}$$

$$C_v = \frac{Y_v}{Y_m} = \frac{2}{K_R + 1} \quad \text{(Eq. 2)}$$

Figure 3:
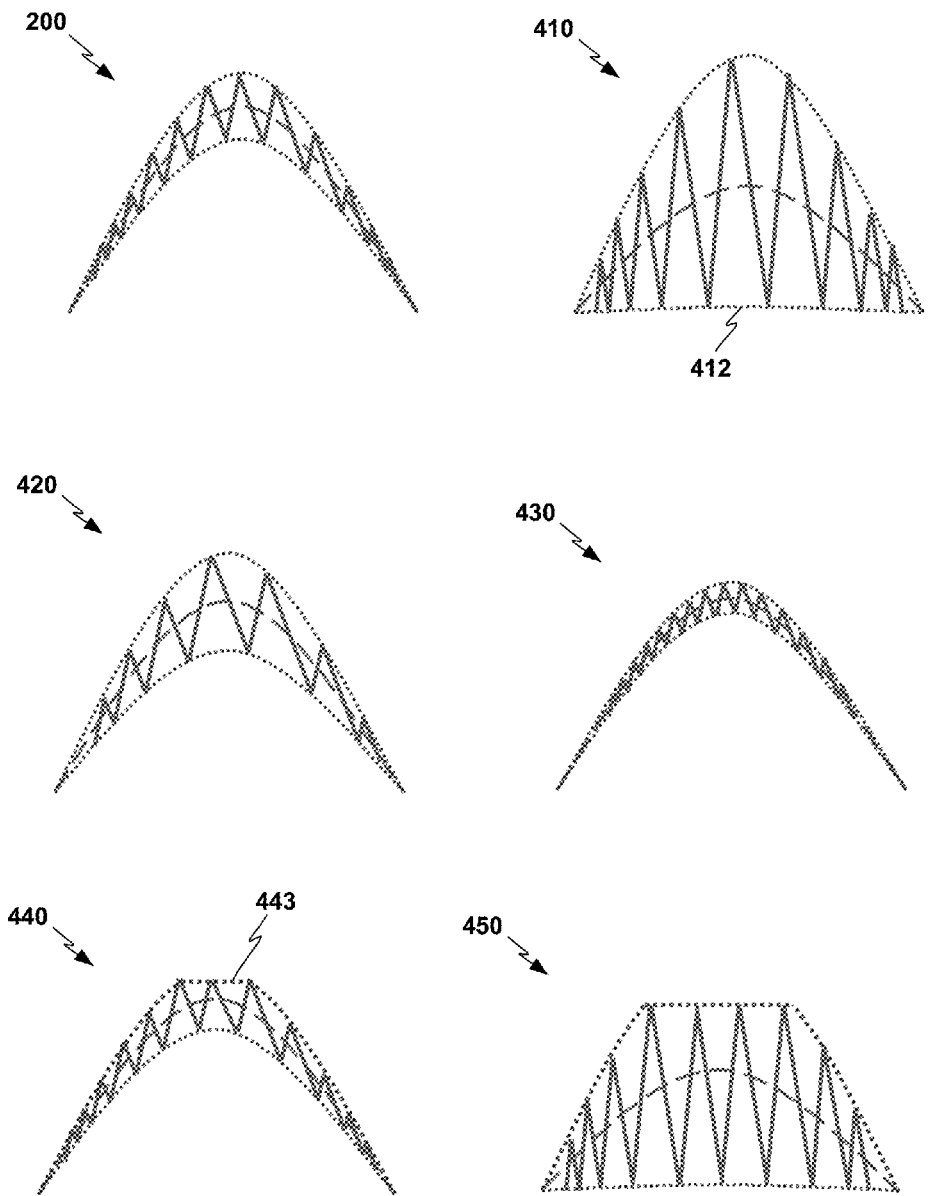
FIG. 3 shows a variety of different current waveforms of example output currents of an AC/DC power converter under control of the digital hysteresis PFC controller of FIG. 1, and demonstrating various selectably controlled values for peak current reference, valley current reference, ripple current, and over current protection (OCP) under control of digital hysteresis PFC controller.

Thus, if a low switching frequency is desired for a given application, the ripple current $K_R$ may be defined in the control variables stored by digital hysteresis PFC controller 110 to be relatively large, whereas if low ripple current and high frequency are desired for a given application, the ripple current $K_R$ may be defined in the control variables stored by digital hysteresis PFC controller 110 to be relatively small. In some applications in which gate switch 106 is particularly sensitive or has long-term performance requirements to avoid being stressed, a selected low switching frequency may also enable low stress on gate switch 106. This flexibility in selecting switching frequency and ripple current enabled by digital hysteresis PFC controller 110 is illustrated in FIG. 3 and further described below with reference thereto.

In some examples, peak current reference module 120 and valley current reference module 122 may be programmed or designed with a stored value of peak current ratio constant Cp and a valley current ratio constant Cv, respectively; may receive average current 218/Ym from multiplier 118; and may determine and output peak current reference 212/Yp and valley current reference 214/Yv, respectively, in accordance with Equations 3 and 4 (below), respectively. Equations 3 and 4 simply rearrange Equations 1 and 2, respectively, to solve for peak and valley current in terms of stored values of peak current ratio constant Cp and valley current ratio constant Cv, and a value for average current Ym as may be received from multiplier 118.

$$Y_p = C_p Y_m \quad \text{(Eq. 3)}$$

$$Y_v = C_v Y_m \quad \text{(Eq. 4)}$$

In some examples, peak current reference module 120 and valley current reference module 122 may be programmed or designed with a stored value of ripple current $K_R$, may receive average current 218/Ym from multiplier 118, and may determine and output peak current reference 212/Yp and valley current reference 214/Yv, respectively, in accordance with Equations 5 and 6 (below), respectively. Equations 5 and 6 simply rearrange Equations 1 and 2, respectively, to solve for peak and valley current in terms of a stored value of ripple current $K_R$ and a value for average current Ym as may be received from multiplier 118.

$$Y_p = \frac{2K_R Y_m}{K_R + 1} \quad \text{(Eq. 5)}$$

$$Y_v = \frac{2Y_m}{K_R + 1} \quad \text{(Eq. 6)}$$

In the various examples above, peak current reference module 120 may output a peak current reference based on the presently sensed average current of the power converter (as supplied via Vin VADC 112, Vout VADC 114, voltage compensator 116, and multiplier 118). In addition, peak current reference module 120 may also output a pre-selected peak reference function, where the pre-selected peak reference function may be defined by one of Equations 1, 3, or 5 as shown and described above, or some other analogous pre-selected peak reference function that incorporates a pre-selected value of peak current reference, ripple current, maximum current for over current protection (OCP) (as further described below), or related parameter. Similarly, in the various examples above, valley current reference module 122 thus outputs a valley current reference based on the presently sensed average current of the power converter (as supplied via Vin VADC 112, Vout VADC 114, voltage compensator 116, and multiplier 118) and a pre-selected valley reference function, where the pre-selected valley reference function may be one of Equations 2, 4, or 6 as shown and described above, or some other analogous preselected valley reference function that incorporates a preselected value of valley current reference, ripple current, operating mode or hysteresis band (as further described below), or related parameter.

FIG. 3 shows a variety of different current waveforms 200, 410, 420, 430, 440, 450 of example output currents of AC/DC power converter 100 under control of digital hysteresis PFC controller 110 of FIG. 1, and demonstrating various selectably controlled values for peak current reference, valley current reference, ripple current, and over current protection (OCP) under control of digital hysteresis PFC controller 110. FIG. 3 illustrates various aspects and advantages of the function of digital hysteresis PFC controller 110. Current waveform 200 is the same discussed above with reference to FIG. 2, and is included in FIG. 3 for purposes of comparison. Current waveform 410 shows the valley current reference 412 selectably set at zero. Whereas current waveform 200 effectively provides a continuous conduction mode (CCM), though with low processing burden, current waveform 410 effectively provides a critical conduction mode (CrCM), though with low stress on the gate switch 106, simply by selectably setting the valley current reference 412 of digital hysteresis PFC controller 110 at or near zero.

Valley current reference module 122 may thus selectably control whether digital hysteresis PFC controller 110 controls AC/DC power converter 100 to operate in CCM or CrCM at any given time, as further described below, by selectably controlling the valley current reference at either a substantially non-zero value or at a substantially zero value. Valley current reference module 122 may thus also selectably control a hysteresis band in which digital hysteresis PFC controller 110 controls AC/DC power converter 100 to remain in either CCM or CrCM before switching to the other operating mode, as further described below.

Current waveform 420 of FIG. 3 is similar to current waveform 200 except the ripple current has been selectably set to be larger than in current waveform 200. Current waveform 430 of FIG. 3 is also similar to current waveform 200 except the ripple current has been selectably set to be smaller than in current waveform 200. Current waveform 440 is similar to current waveform 200 except with over current protection (OCP) selected, such that the peak current reference is capped at a selected OCP value 443, so that the output current cannot rise above the selected maximum current 443 of the OCP. Current waveform 450 has both valley current reference set at zero and a selected OCP imposed, to provide OCP in a CrCM-like mode.

Figure 4:
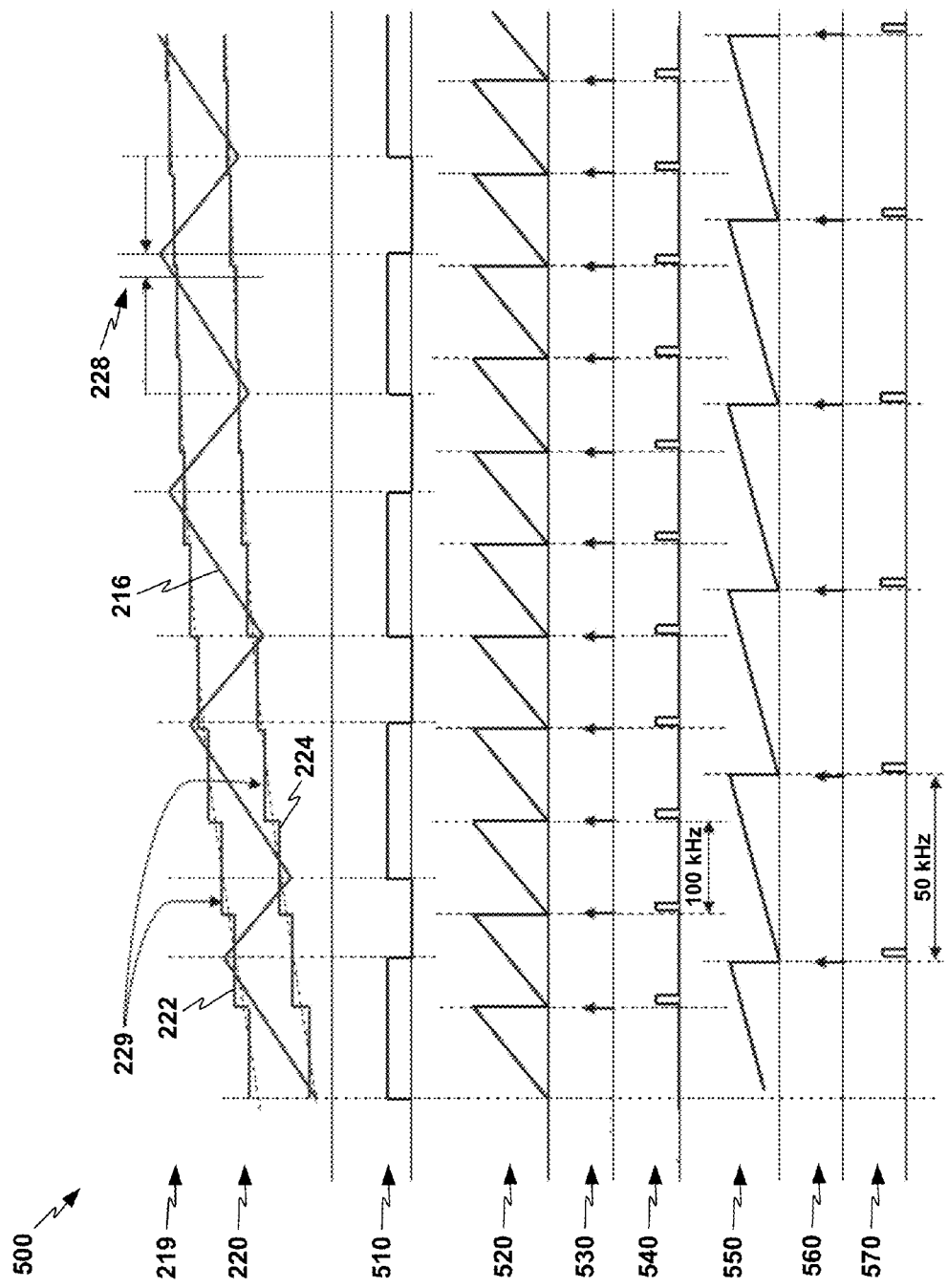
FIG. 4 shows a graph of a close-up view of the digital waveform portion of the example output current as in FIG. 2 together with time-coordinated signals emitted by various components of a digital hysteresis PFC controller that further illustrate the function of a digital hysteresis PFC controller in one implementation.

FIG. 4 shows a graph 500 of close-up view 219 of digital waveform portion 220 of the example output current as in FIG. 2 together with time-coordinated signals emitted by various components of digital hysteresis PFC controller 110 that further illustrate the function of digital hysteresis PFC controller 110 in one implementation. Graph 500 also shows the modulation signal 510 generated by PWM logic circuit 134, a first timer value 520, current loop analog-to-digital (ADC) triggers 530, current loop INT signals 540 (with a frequency of 100 kilohertz (kHz) in this example), a second timer value 550, voltage loop analog-to-digital (ADC) triggers 560, and voltage loop INT signals 570 (with a frequency of 50 kilohertz (kHz) in this example). Current Loop INT signals 540 may update the values of peak current reference module 120 and valley current reference module 122. Updating both may generate new analog voltage references from DACs 124 and 126, respectively. As shown in FIG. 4, when DACs 124 and 126 update their values, a zero-order hold may occur. Voltage Loop INT signals 570 may measure the output voltage via Vout VADC 114 and update the voltage compensator 116 to maintain output voltage.

As shown in FIG. 4, modulation signal 510 outputted by PWM logic circuit 134 being on causes inductor current 216 to rise, and modulation signal 510 outputted by PWM logic circuit 134 being off causes inductor current 216 to fall. As shown in close-up view 219 of digital waveform portion 220, digital peak current reference 222 and digital valley current reference 224 show zero-order hold (ZOH) (229), which is non-existent in analog implementations. Close-up view 219 of digital waveform portion 220 also shows an example of comparator delay 228, or the slight delay inherent in the functioning of comparators 130 and 132 on the current alternating between rising and falling after it has surpassed digital peak current reference 222 or digital valley current reference 224. Current loop ADC triggers 530 and current loop INT signals 540 respond to first timer value 520 by emitting a signal for digital peak current reference 222 and digital valley current reference 224 each to make a step jump to their subsequent values. Voltage loop ADC triggers 560 and voltage loop INT signals 570 respond to second timer value 550 at half the frequency of the first timer and the current loop, in this example.

Figure 5:
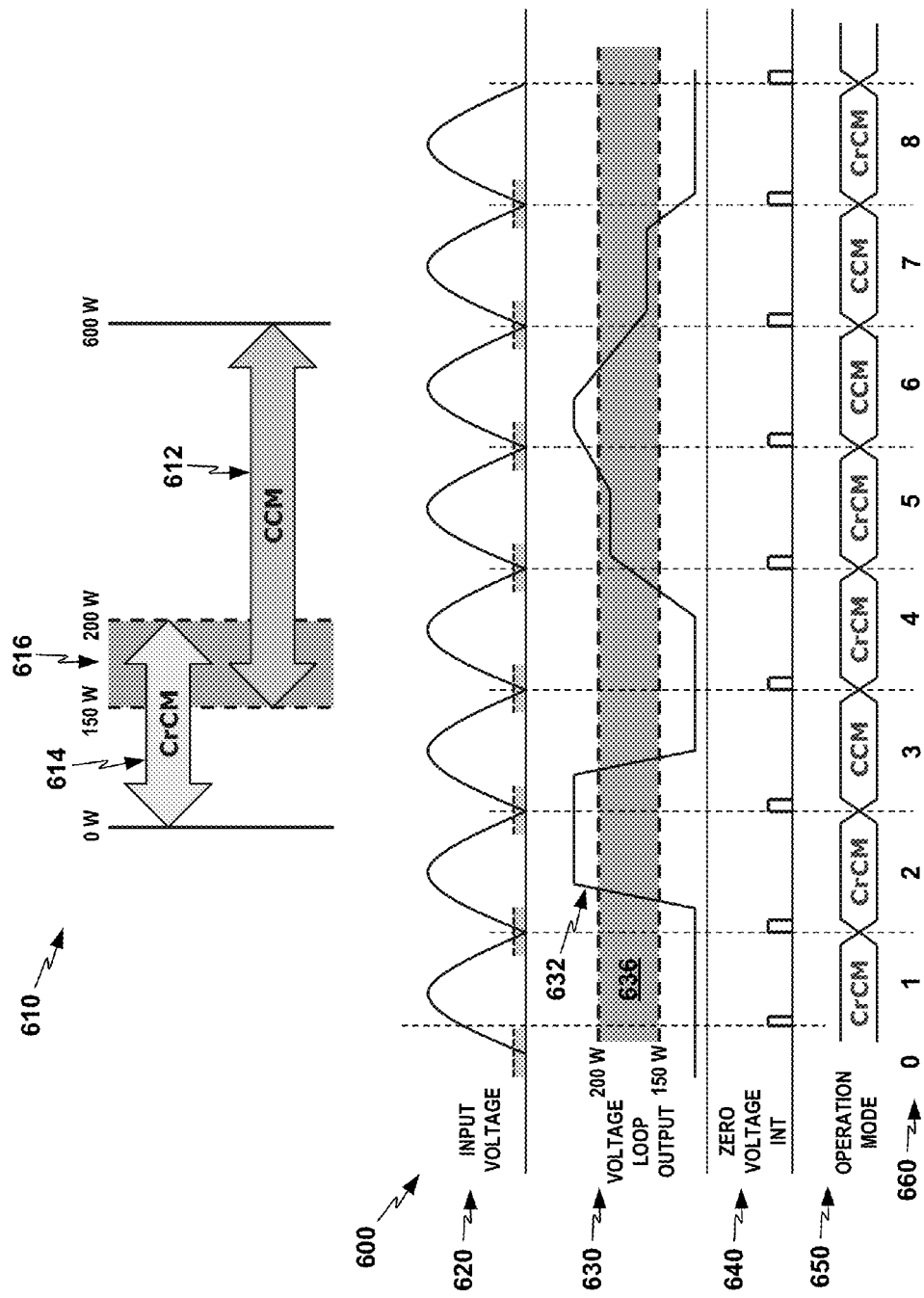
FIG. 5 shows graphs illustrating how an AC/DC power converter under control of a digital hysteresis PFC controller may switch operating mode between a Continuous Conduction Mode (CCM) and a Critical Conduction Mode (CrCM), depending on the power required at any given moment, and with hysteresis in changing between operating modes, in one example.

FIG. 5 shows graphs 600 and 610 illustrating how AC/DC power converter 100 under control of digital hysteresis PFC controller 110 may switch operating mode between a CCM mode and a CrCM mode, depending on the power required at any given moment, and with hysteresis in changing between operating modes, in one example. Graph 600 shows input voltage 620, voltage loop input 630, zero voltage INT signal 640, and present operating mode 650. Graph 610 shows present operating mode relative to present required power output, including CCM mode 612 and CrCM mode 614, which overlap in a hysteresis band 616 between 150 and 200 watts (W) in this example. Hysteresis band 616 in graph 610 is indicated in parallel as a hysteresis band 636 between 150 and 200 W shown in voltage loop input 630 in graph 600.

Graph 610 shows that AC/DC power converter 100 under control of digital hysteresis PFC controller 110 may operate in CCM mode when operating at a present power of anywhere from 150 to 600 W. If the power output drops below 150 W, digital hysteresis PFC controller 110 may switch AC/DC power converter 100 from CCM mode to CrCM mode, such as by selectably setting the valley current reference of digital hysteresis PFC controller 110 at zero, thus transitioning the output current of AC/DC power converter 100 to a CCM-type output such as in waveform 200 as discussed above to a CrCM-type output such as in waveform 410 as discussed above.

Once AC/DC power converter 100 has dipped below 150 W in power output and is operating in CrCM mode, AC/DC power converter 100 may continue operating at any power output between 0 and 200 W while remaining in CrCM mode, as shown in graph 610. Digital hysteresis PFC controller 110 may transition AC/DC power converter 100 back from CrCM mode to CCM mode only if the presently required power rises above 200 W in this example. Thus, the output range from 150 to 200 W in this example may be supplied either in CCM mode or CrCM mode, depending on whichever of the two operating modes AC/DC power converter 100 was already operating in; thus, the overlapping range 616 may be considered a hysteresis band or hysteresis range.

The upper and lower boundaries of hysteresis band 616 may vary substantially above and below the example values of 200 and 150 W respectively, in other implementations. In the example of FIG. 5 and in other implementations, the hysteresis band may coincide with a range of power output at which either CCM or CrCM modes perform well, and at which neither CCM nor CrCM modes impose a significant disadvantage. In any of a wide variety of implementations at different values, digital hysteresis PFC controller 110 may provide some significant hysteresis band to ensure that it avoids a situation of alternating between CCM and CrCM modes too frequently if the presently required power happens to be very close to a transition power level between the two. Thus, in a wide variety of examples, digital hysteresis PFC controller 110 may flexibly operate AC/DC power converter 100 in either CCM mode or CrCM mode at any given time, depending on which of the two may be advantageous for the required power output at a given moment.

Voltage loop input 630 and present operating mode 650 as shown in graph 600 further illustrate the ongoing selection of operating modes by digital hysteresis PFC controller 110 to select for AC/DC power converter 100 over time (with time intervals indicated on line 660, as delimited by half-cycles of the input voltage 620). Voltage loop input 630 includes hysteresis band 636 between 150 and 200 W, and a line 632 indicating present required power output of AC/DC power converter 100 ("power 632"). In the time intervals 0 and 1 (as indicated on line 660) as shown in graph 600, power 632 is well below 150 W, and digital hysteresis PFC controller 110 operates AC/DC power converter 100 in a CrCM mode, as shown for the corresponding time intervals in present operating mode graph 650. In time interval 2, power 632 begins below hysteresis band 636 but then ramps up above hysteresis band 636, where it remains at the end of the time interval; operating mode is CrCM, but is transitioned to CCM in time interval 3 (as shown in graph 650). During time interval 3, power drops below hysteresis band 636, and digital hysteresis PFC controller 110 responds by transitioning back to CrCM mode for time interval 4.

Power 632 then rises into hysteresis band 636 and ends time interval 4 within the hysteresis band 636, so digital hysteresis PFC controller 110 keeps within CrCM mode in time interval 5. Power 632 rises slightly above hysteresis band 636 by the end of time interval 5, so digital hysteresis PFC controller 110 transitions to CCM for time interval 6. Power 632 drops into hysteresis band 636 where it ends time interval 6, so digital hysteresis PFC controller 110 keeps within CCM mode in time interval 7. Power 632 then drops just below hysteresis band 636 before the end of time interval 7, so digital hysteresis PFC controller 110 transitions back to CrCM mode in time interval 8. These examples further illustrate how digital hysteresis PFC controller 110 may continue to operate the power output of AC/DC power converter 100 to always remain in an advantageous operating mode between CCM and CrCM with respect to its present power output, while using a hysteresis band in transition between the two in a power range where there is no compelling advantage between either CCM or CrCM to keep from transitioning too frequently.

Peak current reference module 120 and valley current reference module 122 of digital hysteresis PFC controller 110 may thus enable the power, operating mode, hysteresis band, ripple current, and over current protection in AC/DC power converter 100 to be selectably controllable in accordance with any of a variety of control parameters. The control parameters for peak current reference module 120 and valley current reference module 122 may be selected or designated either on initial manufacture of AC/DC power converter 100 and initial programming of peak current reference module 120 and valley current reference module 122, or as part of a later firmware or software modification or upgrade to digital hysteresis PFC controller 110, and/or algorithmically in response to various operating parameters of AC/DC power converter 100, in various examples.

Figure 6:
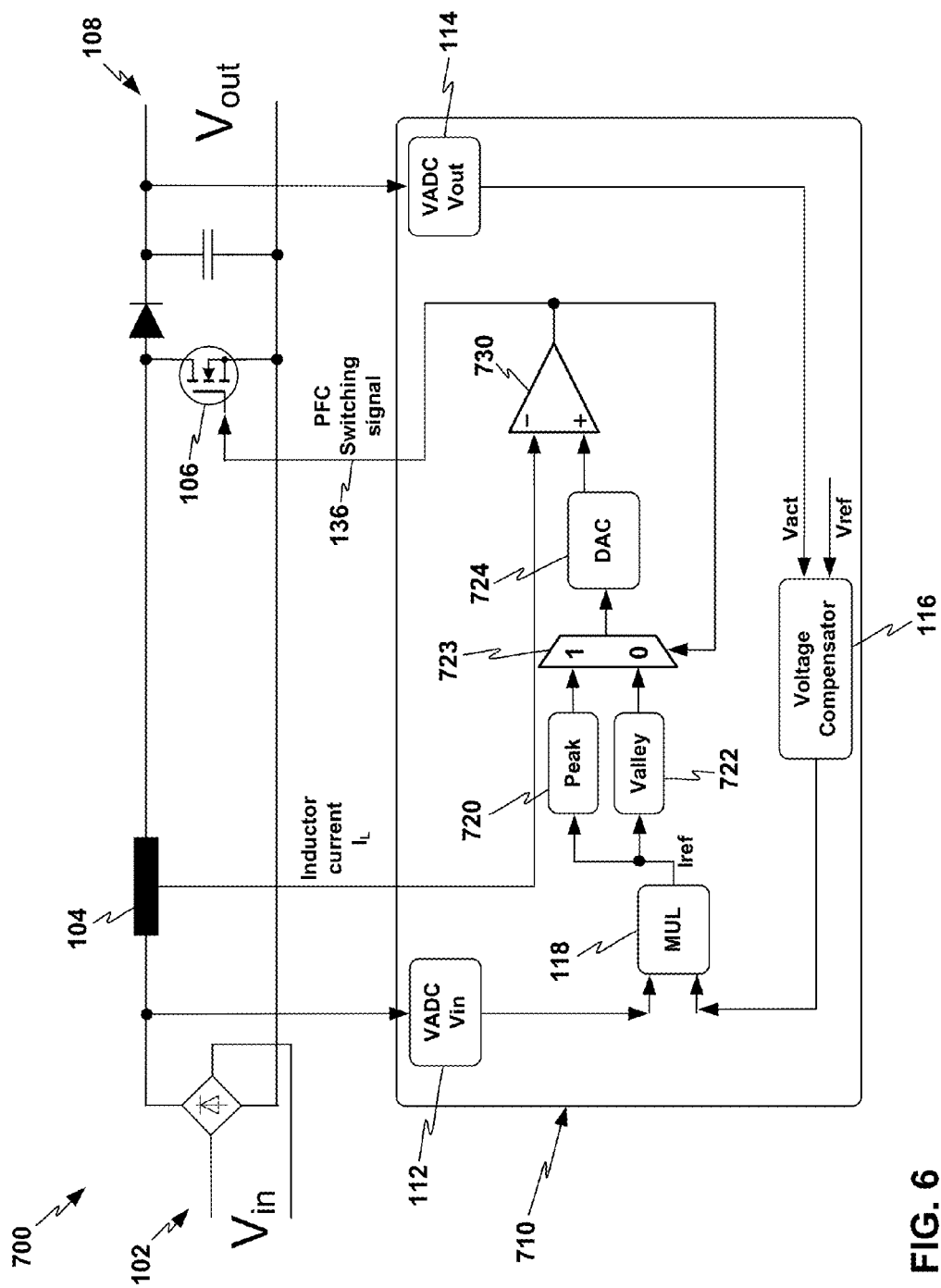
FIG. 6 shows an AC/DC power converter with a single comparator hysteresis PFC controller as a different example implementation of a hysteresis PFC controller of this disclosure, distinct from a digital hysteresis PFC controller, while also providing similarly advantageous features of a hysteresis PFC controller as described above.

FIG. 6 shows an AC/DC power converter 700 with a single comparator hysteresis PFC controller 710 as a different example implementation of a hysteresis PFC controller of this disclosure, distinct from the digital hysteresis PFC controller 110 described above, while also providing similarly advantageous features of a hysteresis PFC controller as described above. Single comparator hysteresis PFC controller 710 includes some components in common with digital hysteresis PFC controller 110 as described above, including input voltage (Vin) voltage analog-to-digital converter (VADC) 112, output voltage (Vout) VADC 114, voltage compensator 116, and multiplier 118. AC/DC power converter 700 also shares components in common with AC/DC power converter 100 as described above, including voltage in Vin terminal 102, inductor 104, metal-oxide semiconductor field effect transistor (MOSFET) gate switch 106, voltage out Vout terminal 108, and output pin 136. Single comparator hysteresis PFC controller 710 also includes peak current reference module 720, valley current reference module 722, multiplexer 723, a single digital to analog converter (DAC) 724, and a single comparator 730. Single comparator hysteresis PFC controller 710 may thus provide digital peak and valley current references, and with the advantages described above with reference to digital hysteresis PFC controller 110, in a simple implementation with fewer components than digital hysteresis PFC controller 110.

As FIG. 6 shows, an inductor current sense from inductor 104 is connected to the inverting input of comparator 730. The outputs of peak current reference module 720 and valley current reference module 722 are connected to input to multiplexer 723. The output of multiplexer 723 is inputted to DAC 724, and the output of DAC 724 is connected to the non-inverting input of comparator 730. Multiplexer 723 may thus be thought of as compensating for the lack of a second DAC and a second comparator as in digital hysteresis PFC controller 110. Single comparator hysteresis PFC controller 710 may thus be configured to output a digital peak current reference and a digital valley current reference as described above, though only outputting one at a time and alternating between the two as needed, as further described below with reference to FIG. 7.

In some examples, peak current reference module 720, valley current reference module 722, multiplexer 723, DAC 724, and comparator 730 may be implemented in a single integrated circuit (IC), which may be implemented in a microcontroller, an application-specific integrated circuit (ASIC), or a digital signal processor (DSP), in some examples. Analogously to digital hysteresis PFC controller 110 as described above, in some examples, single comparator hysteresis PFC controller 710 may be implemented as a microcontroller. In some examples, Vin VADC 112, Vout VADC 114, multiplexer 723, DAC 724, and comparator 730 may be implemented as hardware components, and voltage compensator 116, multiplier 118, peak current reference module 720, and valley current reference module 722 may be implemented as modules or portions of software. Software implementations of voltage compensator 116, multiplier 118, peak current reference module 720, and valley current reference module 722 may be implemented as firmware, and may be stored on one or more storage components and/or executed by one or more processing units, such as a central processing unit (CPU) of single comparator hysteresis PFC controller 710.

Peak current reference module 720 and valley current reference module 722 may be implemented with all of the functions described above for peak current reference module 120 and valley current reference module 122, including flexibly controlling the peak and valley current references, operating mode (CCM or CrCM), ripple current, and over-current protection, as described above. In other examples, different features of single comparator hysteresis PFC controller 710 may be implemented in any of various types of hardware and/or software elements. Peak current reference module 720 and valley current reference module 722 may selectably enable single comparator hysteresis PFC controller 710 to selectably control AC/DC power converter 700 to generate an output current with a power, operating mode, hysteresis band, ripple current, and over current protection that may all be selectably controlled. Peak current reference module 720 and valley current reference module 722 may enable the power, operating mode, hysteresis band, ripple current, and over current protection to be selectably controllable in accordance with any of a variety of control parameters that may be selected or designated either on initial manufacture of AC/DC power converter 700 and initial programming of peak current reference module 720 and valley current reference module 722, or as part of a firmware or software modification or upgrade to single comparator hysteresis PFC controller 710, and/or algorithmically in response to various operating parameters of AC/DC power converter 700, in various examples.

Figure 7:
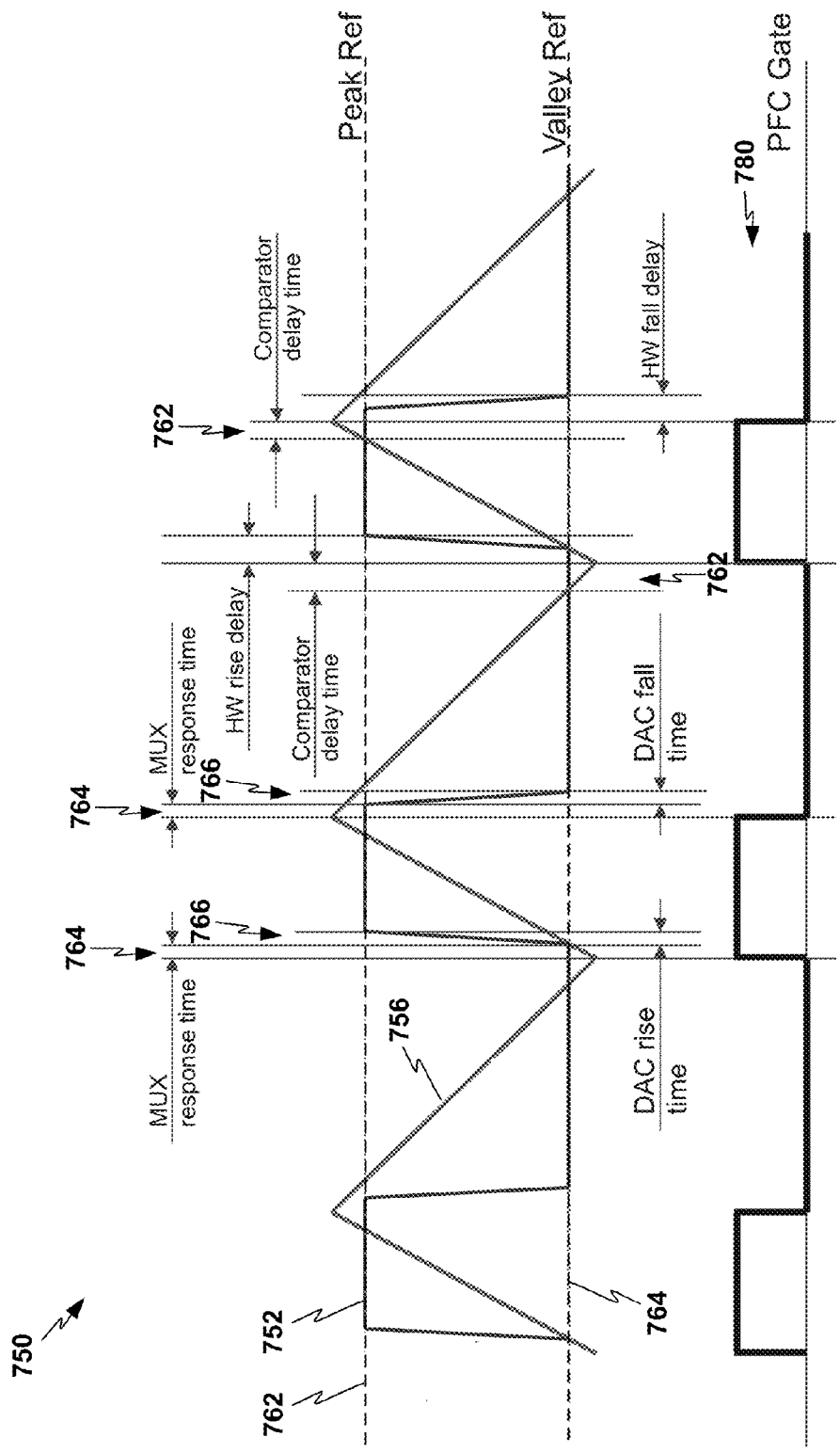
FIG. 7 shows a graph of a current output of an AC/DC power converter controlled with an alternating current reference that alternates between a peak current reference value and a valley current reference value, under control of a single comparator PFC controller as described above, in one example.

FIG. 7 shows a graph 750 of a current output 756 of an AC/DC power converter 700 controlled with an alternating current reference 752 that alternates between a peak current reference value 762 and a valley current reference value 764, under control of a single comparator PFC controller 710 as described above, in one example. Alternating current reference 752 alternates between peak current reference value 762 and valley current reference value 764 depending on the output from multiplexer 723 via DAC 724 to comparator 730, as described above, where the output from multiplexer 723 alternates between the peak current reference value 762 and valley current reference value 764 as outputted by peak current reference module 720 and valley current reference module 722. Graph 750 also shows single comparator PFC controller output signal 780 as it is output to gate switch 106 to turn gate switch 106 on and off, in this example.

FIG. 7 also shows several examples of the total delay between current output 756 crossing alternating current reference 752, current output 756 reversing between rising and falling based on single comparator PFC controller output signal 780, and alternating current reference 752 performing its subsequent alteration. The total delay includes first, a comparator delay time 762 due to comparator 730; second, a multiplexer response time 764 due to multiplexer 723; and third, a DAC response time 766 due to DAC 724. While single comparator PFC controller 710 has the advantages of being simpler and having fewer components, digital hysteresis PFC controller 110 as described above has the advantage of having generally lower total delay times in analogous implementations, particularly for a larger range of a hysteresis band. Thus, single comparator PFC controller 710 may be more advantageous to implement in a specialized hardware element such as an ASIC or a DSP as indicated above, while digital hysteresis PFC controller 110 may offer more flexibility to implement advantageously in a more general-purpose microcontroller, in some examples, though the specific advantages and trade-offs in any particular implementation may be variable and may be addressed in the ordinary course of engineering design, as persons skilled in the art will appreciate.

Figure 8:
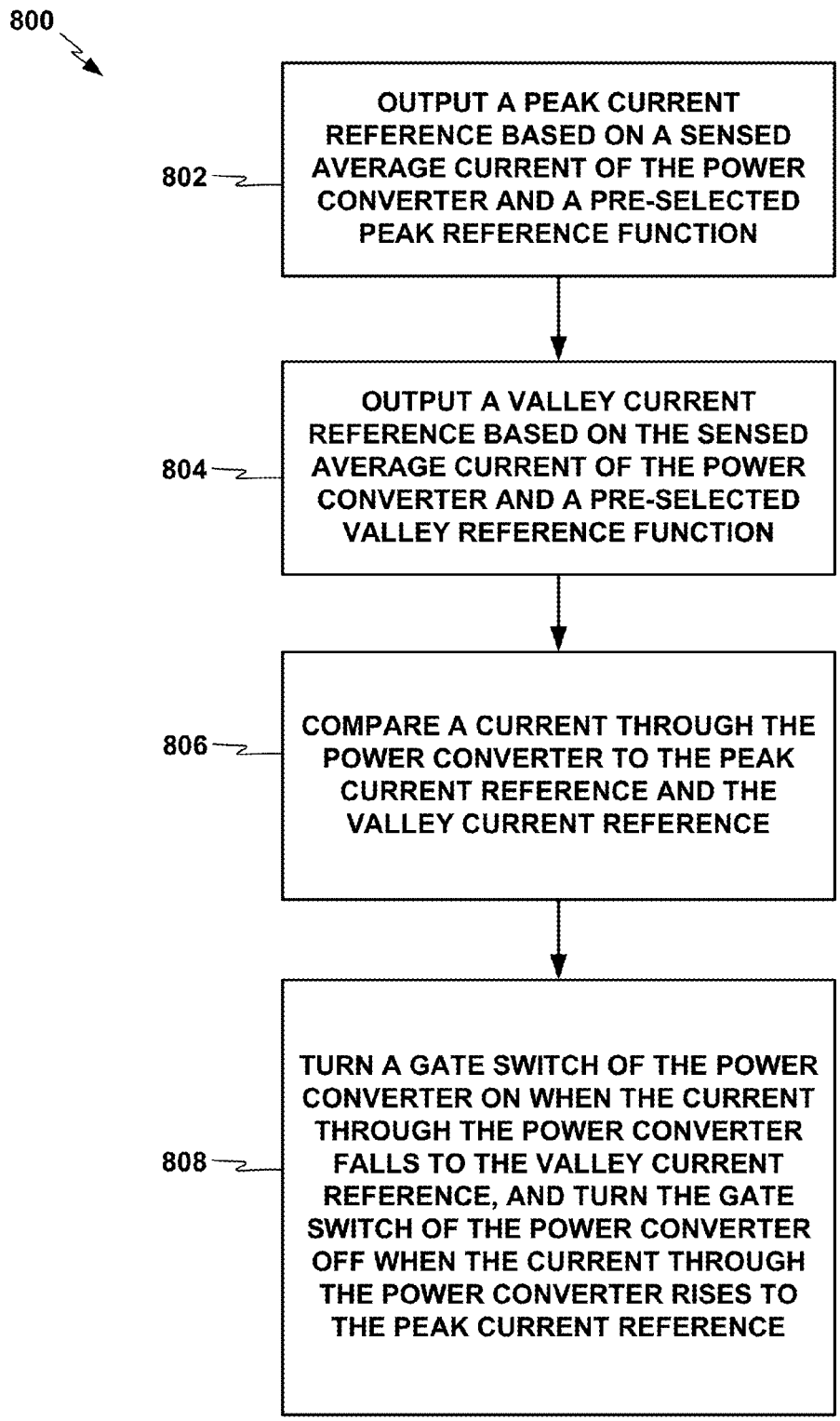
FIG. 8 is a flowchart illustrating a method of operating a hysteresis PFC controller to advantageously control the output of an AC/DC power converter, e.g., to operate flexibly in either a CCM or CrCM mode at any given time depending on the output power, as well as flexibly controlling the peak and valley current references, ripple current, and over-current protection, as described above, among other advantages, in accordance with an example of this disclosure.

FIG. 8 is a flowchart illustrating a method 800 of operating a hysteresis PFC controller to advantageously control the output of an AC/DC power converter, e.g., to operate flexibly in either a CCM or CrCM mode at any given time depending on the output power, as well as flexibly controlling the peak and valley current references, ripple current, and over-current protection, as described above, among other advantages, in accordance with an example of this disclosure. Method 800 may coincide with methods of operating hysteresis PFC controllers of this disclosure including digital hysteresis PFC controller 100 and single comparator hysteresis PFC controller 710 as described above with reference to FIGS. 1-7.

In the example of FIG. 8, method 800 includes outputting a peak current reference based on a sensed average current of the power converter and a pre-selected peak reference function (e.g., peak current reference module 120 or 720 outputting a peak current reference 212 or Yp, in accordance with, e.g., Equations 1, 3, or 5, or otherwise selectably controlling ripple current and/or a maximum current for over current protection (OCP), as described above with reference to FIGS. 1-7) (802). Method 800 further includes outputting a valley current reference based on the sensed average current of the power converter and a pre-selected valley reference function (e.g., valley current reference module 122 or 722 outputting a valley current reference 214 or Yv, in accordance with, e.g., Equations 2, 4, or 6, or otherwise selectably controlling ripple current, operating mode, and/or hysteresis band, as described with reference to FIGS. 1-7) (804).

Method 800 further includes comparing a current through the power converter to the peak current reference and the valley current reference (e.g., comparators 130 and 132 comparing inductor current through inductor 104 with peak current reference and valley current reference from peak current reference module 120 and valley current reference module 122 of digital hysteresis PFC controller 110, or single comparator 730 comparing inductor current through inductor 104 with peak current reference and valley current reference from peak current reference module 720 and valley current reference module 722 via multiplexer 723 as in single comparator hysteresis PFC controller 710, as described above with reference to FIGS. 1-7) (806). Method 800 further includes turning a gate switch of the power converter on when the current through the power converter falls to the valley current reference, and turning the gate switch of the power converter off when the current through the power converter rises to the peak current reference (e.g., PWM logic circuit 134 or single comparator 730 applying an output modulation signal to gate switch 106 to turn gate switch 106 on and off as determined according to the selectable control parameters of digital hysteresis PFC controller 110 or single comparator hysteresis PFC controller 710, as described above with reference to FIGS. 1-7) (808).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

For example, a hysteresis PFC controller of this disclosure (e.g., hysteresis PFC controllers 110, 710) may be implemented or embodied as an integrated circuit configured, via any combination of hardware, logic, general purpose processors, application specific integrated circuits (ASICs), field programmable gate arrays (FPGAs), and/or general processing circuits, which may execute software instructions in some examples, to perform various functions described herein.

Some embodiments of the disclosure may be implemented as in the following examples, numbered A1-A20:

A1. A controller for a power converter, the controller comprising: a peak current reference module configured to output a peak current reference; a valley current reference module configured to output a valley current reference; and one or more comparators configured to compare a current through the power converter to the peak current reference and the valley current reference, to turn a gate switch of the power converter on when the current through the power converter falls to the valley current reference, and to turn the gate switch of the power converter off when the current through the power converter rises to the peak current reference.

A2. The controller of example A1, wherein the peak current reference module and the valley current reference module are configurable to selectably control the current through the power converter to alternate between operating in a continuous conduction mode (CCM) and a critical conduction mode (CrCM) based on a present value of power through the power converter.

A3. The controller of examples A1 or A2, wherein the peak current reference module and the valley current reference module are configurable to selectably control the current through the power converter to remain operating in either CCM or CrCM when a present value of power through the power converter is at a value of power within a hysteresis band.

A4. The controller of any of examples A1-A3, wherein the one or more comparators comprise a first comparator and a second comparator, the first comparator having a first input pin connected to an output of the peak current reference module, and the second comparator having a first input pin connected to an output of the valley current reference module.

A5. The controller of any of examples A1-A4, wherein the first input pin of the first comparator is connected to the output of the peak current reference module via a first digital-to-analog converter (DAC), and the first input pin of the second comparator is connected to the output of the valley current reference module via a second digital-to-analog converter (DAC).

A6. The controller of any of examples A1-A5, wherein the current through the power converter is an inductor current through an inductor of the power converter, the controller further being configured such that an inductor current sensor at the inductor is connected to a second input pin of the first comparator and to a second input pin of the second comparator.

A7. The controller of example A1, wherein the one or more comparators comprise a single comparator, the controller further comprising a multiplexer having inputs connected to the outputs of the peak current reference module and the valley current reference module, the comparator having a first input pin connected to an output of the multiplexer.

A8. The controller of examples A1 or A7, wherein the current through the power converter is an inductor current through an inductor of the power converter, the controller further being configured such that an inductor current sensor at the inductor is connected to a second input pin of the comparator.

A9. The controller of any of examples A1-A8, wherein the peak current reference module and the valley current reference module are configurable to selectably control the peak current reference and the valley current reference as determined based on a sensed present average current of the power converter, and a pre-selected peak current ratio constant and a pre-selected valley current ratio constant, respectively.

A10. The controller of any of examples A1-A9, wherein the peak current reference module and the valley current reference module are configurable to selectably control the peak current reference and the valley current reference as determined based on a sensed present average current of the power converter and a pre-selected ripple current.

A11. The controller of any of examples A1-A10, wherein the peak current reference module is configurable to selectably control the peak current reference to enforce a maximum current for an over current protection mode.

A12. The controller of any of examples A1-A11, wherein the valley current reference module is configurable to selectably control the valley current reference to alternate between a substantially non-zero value and a substantially zero value to alternate operation of the power converter in a continuous conduction mode (CCM) and a critical conduction mode (CrCM), respectively, based on a present value of power output by the power converter, and based on whether the power converter was being operated in CCM or CrCM in a prior voltage half-cycle interval of time, if the present value of power output by the power converter is within a selected hysteresis band.

A13. A method of controlling a power converter, the method comprising: outputting a peak current reference based on a sensed average current of the power converter and a pre-selected peak reference function; outputting a valley current reference based on the sensed average current of the power converter and a pre-selected valley reference function; comparing a current through the power converter to the peak current reference and the valley current reference; and turning a gate switch of the power converter on when the current through the power converter falls to the valley current reference, and turning the gate switch of the power converter off when the current through the power converter rises to the peak current reference.

A14. The method of example A13, further comprising selectably controlling the current through the power converter to alternate between operating in a continuous conduction mode (CCM) and a critical conduction mode (CrCM) based on a present value of power through the power converter.

A15. The method of examples A13 or A14, further comprising selectably controlling the current through the power converter to remain operating in either CCM or CrCM when a present value of power through the power converter is at a value of power within a hysteresis band.

A16. A device for controlling a power converter, the device comprising: a multiplier configured to sense a value of power output by the power converter; a peak current reference module connected to an output of the multiplier and configured to output a peak current reference based on the power output and a pre-selected peak current reference value; a valley current reference module connected to the output of the multiplier and configured to output a valley current reference based on the power output and a pre-selected valley current reference value; and one or more comparators configured to compare a current through the power converter to the peak current reference and the valley current reference, to turn a gate switch of the power converter on when the current through the power converter falls to the valley current reference, and to turn the gate switch of the power converter off when the current through the power converter rises to the peak current reference.

A17. The device of example A16, wherein the peak current reference module and the valley current reference module are configurable to selectably control the current through the power converter to alternate between operating in a continuous conduction mode (CCM) and a critical conduction mode (CrCM) based on a present value of power through the power converter, wherein the peak current reference module and the valley current reference module are configurable to selectably control the current through the power converter to remain operating in either CCM or CrCM when a present value of power through the power converter is at a value of power within a hysteresis band.

A18. The device of examples A16 or A17, wherein the one or more comparators comprise a first comparator and a second comparator, the first comparator having a first input pin connected to an output of the peak current reference module, and the second comparator having a first input pin connected to an output of the valley current reference module, wherein the first input pin of the first comparator is connected to the output of the peak current reference module via a first digital-to-analog converter (DAC), and the first input pin of the second comparator is connected to the output of the valley current reference module via a second digital-to-analog converter (DAC), and wherein the current through the power converter is an inductor current through an inductor of the power converter, the controller further being configured such that an inductor current sensor at the inductor is connected to a second input pin of the first comparator and to a second input pin of the second comparator.

A19. The device of examples A16 or A17, wherein the one or more comparators comprise a single comparator, the device further comprising a multiplexer having inputs connected to the outputs of the peak current reference module and the valley current reference module, the comparator having a first input pin connected to an output of the multiplexer, wherein the device comprises an integrated circuit, wherein at least the peak current reference module, the valley current reference, the multiplexer, and the single comparator are comprised in the integrated circuit, wherein the current through the power converter is an inductor current through an inductor of the power converter, the controller further being configured such that an inductor current sensor at the inductor is connected to a second input pin of the comparator.

A20. The device of any of examples A16-A19, wherein the valley current reference module is configurable to selectably control the valley current reference to alternate between a substantially non-zero value and a substantially zero value to alternate operation of the power converter in a continuous conduction mode (CCM) and a critical conduction mode (CrCM), respectively, based on the value of power output by the power converter, and based on whether the power converter was being operated in CCM or CrCM in a prior voltage half-cycle interval of time if the value of power output by the power converter is within a selected hysteresis band.

Various examples of the invention have been described. These and other examples are within the scope of the following claims.

What is claimed is:

1. A controller for a power converter, the controller comprising:
    a peak current reference module configured to output a peak current reference;
    a valley current reference module configured to output a valley current reference; and
    one or more comparators configured to compare a current through the power converter to the peak current reference and the valley current reference, to turn a gate switch of the power converter on when the current through the power converter falls to the valley current reference, and to turn the gate switch of the power converter off when the current through the power converter rises to the peak current reference,
    wherein the peak current reference module and the valley current reference module are configurable to selectably control the current through the power converter to alternate between operating in a continuous conduction mode (CCM) and a critical conduction mode (CrCM) based on a present value of power through the power converter,
    wherein the peak current reference module and the valley current reference module are configurable to selectably control the current through the power converter to remain operating in either CCM or CrCM when a present value of power through the power converter is at a value of power within a hysteresis band.

2. The controller of claim 1, wherein the one or more comparators comprise a single comparator, the controller further comprising a multiplexer having inputs connected to the outputs of the peak current reference module and the valley current reference module, the comparator having a first input pin connected to an output of the multiplexer.

3. The controller of claim 2, wherein the current through the power converter is an inductor current through an inductor of the power converter, the controller further being configured such that an inductor current sensor at the inductor is connected to a second input pin of the comparator.

4. The controller of claim 1, wherein the peak current reference module and the valley current reference module are configurable to selectably control the peak current reference and the valley current reference as determined based on a sensed present average current of the power converter, and a pre-selected peak current ratio constant and a pre-selected valley current ratio constant, respectively.

5. The controller of claim 1, wherein the peak current reference module is configurable to selectably control the peak current reference to enforce a maximum current for an over current protection mode.

6. The controller of claim 1, wherein the one or more comparators comprise a first comparator and a second comparator, the first comparator having a first input pin connected to an output of the peak current reference module, and the second comparator having a first input pin connected to an output of the valley current reference module.

7. The controller of claim 1, wherein the first input pin of the first comparator is connected to the output of the peak current reference module via a first digital-to-analog converter (DAC), and the first input pin of the second comparator is connected to the output of the valley current reference module via a second digital-to-analog converter (DAC).

8. The controller of claim 1, wherein the current through the power converter is an inductor current through an inductor of the power converter, the controller further being configured such that an inductor current sensor at the inductor is connected to a second input pin of the first comparator and to a second input pin of the second comparator.

9. A controller for a power converter, the controller comprising:
a peak current reference module configured to output a peak current reference;
a valley current reference module configured to output a valley current reference; and
one or more comparators configured to compare a current through the power converter to the peak current reference and the valley current reference, to turn a gate switch of the power converter on when the current through the power converter falls to the valley current reference, and to turn the gate switch of the power converter off when the current through the power converter rises to the peak current reference,
wherein the one or more comparators comprise a first comparator and a second comparator, the first comparator having a first input pin connected to an output of the peak current reference module, and the second comparator having a first input pin connected to an output of the valley current reference module,
wherein the first input pin of the first comparator is connected to the output of the peak current reference module via a first digital-to-analog converter (DAC), and the first input pin of the second comparator is connected to the output of the valley current reference module via a second digital-to-analog converter (DAC).

10. The controller of claim 9, wherein the current through the power converter is an inductor current through an inductor of the power converter, the controller further being configured such that an inductor current sensor at the inductor is connected to a second input pin of the first comparator and to a second input pin of the second comparator.

11. The controller of claim 9, wherein the peak current reference module and the valley current reference module are configurable to selectably control the peak current reference and the valley current reference as determined based on a sensed present average current of the power converter, and a pre-selected peak current ratio constant and a pre-selected valley current ratio constant, respectively.

12. A method of controlling a power converter, the method comprising:
outputting a peak current reference based on a sensed average current of the power converter and a pre-selected peak reference function;
outputting a valley current reference based on the sensed average current of the power converter and a pre-selected valley reference function;
comparing a current through the power converter to the peak current reference and the valley current reference;
turning a gate switch of the power converter on when the current through the power converter falls to the valley current reference, and turning the gate switch of the power converter off when the current through the power converter rises to the peak current reference;
selectably controlling the current through the power converter to alternate between operating in a continuous conduction mode (CCM) and a critical conduction mode (CrCM) based on a present value of power through the power converter; and
selectably controlling the current through the power converter to remain operating in either CCM or CrCM when a present value of power through the power converter is at a value of power within a hysteresis band.

13. The method of claim 12, wherein the current through the power converter is an inductor current through an inductor of the power converter, wherein comparing the current through the power converter to the peak current reference and the valley current reference comprises comparing the current through inductor of the power converter to an output of a peak current reference module converted via a first digital-to-analog converter (DAC), and comparing the current through inductor of the power converter to an output of a valley current reference module converted via a second digital-to-analog converter (DAC).

14. The method of claim 12, further comprising selectably controlling the peak current reference and the valley current reference as determined based on a sensed present average current of the power converter and a pre-selected ripple current.

15. A device for controlling a power converter, the device comprising:
a multiplier configured to sense a value of power output by the power converter;
a peak current reference module connected to an output of the multiplier and configured to output a peak current reference based on the power output and a pre-selected peak current reference value;
a valley current reference module connected to the output of the multiplier and configured to output a valley current reference based on the power output and a pre-selected valley current reference value; and
one or more comparators configured to compare a current through the power converter to the peak current reference and the valley current reference, to turn a gate switch of the power converter on when the current through the power converter falls to the valley current reference, and to turn the gate switch of the power converter off when the current through the power converter rises to the peak current reference,
wherein the peak current reference module and the valley current reference module are configurable to selectably control the current through the power converter to alternate between operating in a continuous conduction mode (CCM) and a critical conduction mode (CrCM) based on a present value of power through the power converter,
wherein the peak current reference module and the valley current reference module are configurable to selectably control the current through the power converter to remain operating in either CCM or CrCM when a present value of power through the power converter is at a value of power within a hysteresis band.

16. The device of claim 15,
wherein the one or more comparators comprise a first comparator and a second comparator, the first comparator having a first input pin connected to an output of the peak current reference module, and the second comparator having a first input pin connected to an output of the valley current reference module,
wherein the first input pin of the first comparator is connected to the output of the peak current reference module via a first digital-to-analog converter (DAC), and the first input pin of the second comparator is connected to the output of the valley current reference module via a second digital-to-analog converter (DAC), and wherein the current through the power converter is an inductor current through an inductor of the power converter, the controller further being configured such that an inductor current sensor at the inductor is connected to a second input pin of the first comparator and to a second input pin of the second comparator.

17. The device of claim 15, wherein the one or more comparators comprise a single comparator, the device further comprising a multiplexer having inputs connected to the outputs of the peak current reference module and the valley current reference module, the comparator having a first input pin connected to an output of the multiplexer, wherein the device comprises an integrated circuit, wherein at least the peak current reference module, the valley current reference, the multiplexer, and the single comparator are comprised in the integrated circuit, wherein the current through the power converter is an inductor current through an inductor of the power converter, the controller further being configured such that an inductor current sensor at the inductor is connected to a second input pin of the comparator.

18. The device of claim 15, wherein the valley current reference module is configurable to selectably control the valley current reference to alternate between a substantially non-zero value and a substantially zero value to alternate operation of the power converter in a continuous conduction mode (CCM) and a critical conduction mode (CrCM), respectively, based on the value of power output by the power converter, and based on whether the power converter was being operated in CCM or CrCM in a prior voltage half-cycle interval of time if the value of power output by the power converter is within a selected hysteresis band.

19. A controller for a power converter, the controller comprising:

a peak current reference module configured to output a peak current reference;

a valley current reference module configured to output a valley current reference; and one or more comparators configured to compare a current through the power converter to the peak current reference and the valley current reference, to turn a gate switch of the power converter on when the current through the power converter falls to the valley current reference, and to turn the gate switch of the power converter off when the current through the power converter rises to the peak current reference, wherein the peak current reference module and the valley current reference module are configurable to selectably control the peak current reference and the valley current reference as determined based on a sensed present average current of the power converter and a preselected ripple current.

20. A controller for a power converter, the controller comprising:

a peak current reference module configured to output a peak current reference;

a valley current reference module configured to output a valley current reference; and one or more comparators configured to compare a current through the power converter to the peak current reference and the valley current reference, to turn a gate switch of the power converter on when the current through the power converter falls to the valley current reference, and to turn the gate switch of the power converter off when the current through the power converter rises to the peak current reference, wherein the valley current reference module is configurable to selectably control the valley current reference to alternate between a substantially non-zero value and a substantially zero value to alternate operation of the power converter in a continuous conduction mode (CCM) and a critical conduction mode (CrCM), respectively, based on a present value of power output by the power converter, and based on whether the power converter was being operated in CCM or CrCM in a prior voltage half-cycle interval of time, if the present value of power output by the power converter is within a selected hysteresis band.

* * * * *